US008250032B2

(12) United States Patent
Fletcher et al.

(10) Patent No.: US 8,250,032 B2
(45) Date of Patent: Aug. 21, 2012

(54) OPTIMIZING PUBLISH/SUBSCRIBE MATCHING FOR NON-WILDCARDED TOPICS

(75) Inventors: Benjamin J. Fletcher, Winchester (GB); Martin J. Gale, Winchester (GB); Neil G. Young, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 12/476,558

(22) Filed: Jun. 2, 2009

(65) Prior Publication Data

US 2010/0306264 A1    Dec. 2, 2010

(51) Int. Cl.
*G06F 7/00*     (2006.01)
*G06F 17/00*    (2006.01)

(52) U.S. Cl. ........................ 707/627; 707/628; 707/632

(58) Field of Classification Search ........................ None
See application file for complete search history.

(56) References Cited

U.S. PATENT DOCUMENTS

| | | | | |
|---|---|---|---|---|
| 7,051,066 B1* | 5/2006 | Albert et al. | ................ | 709/202 |
| 7,356,529 B1* | 4/2008 | Ennis et al. | ................ | 370/396 |
| 7,376,636 B1* | 5/2008 | Wang et al. | ................ | 707/694 |
| 7,529,746 B2* | 5/2009 | Ichiriu et al. | ................ | 1/1 |
| 7,551,629 B2* | 6/2009 | Chen et al. | ................ | 370/401 |
| 7,802,071 B2* | 9/2010 | Oved | ................ | 711/170 |
| 2002/0141401 A1* | 10/2002 | Albert et al. | ................ | 370/389 |
| 2003/0120652 A1* | 6/2003 | Tifft | ................ | 707/6 |
| 2003/0185211 A1 | 10/2003 | Yang | | |
| 2004/0236780 A1* | 11/2004 | Blevins et al. | ................ | 707/102 |
| 2004/0254993 A1* | 12/2004 | Mamas | ................ | 709/206 |
| 2005/0021843 A1* | 1/2005 | Duigenan et al. | ............ | 709/238 |
| 2006/0059165 A1* | 3/2006 | Bosloy et al. | ................ | 707/10 |
| 2006/0080596 A1* | 4/2006 | Bhogal et al. | ................ | 715/503 |
| 2006/0168331 A1* | 7/2006 | Thompson et al. | .......... | 709/238 |
| 2007/0174232 A1* | 7/2007 | Barcia et al. | ................ | 707/2 |
| 2008/0288456 A1* | 11/2008 | Omoigui | ................ | 707/3 |
| 2009/0215453 A1* | 8/2009 | Blanco Blanco et al. | .. | 455/435.1 |

FOREIGN PATENT DOCUMENTS

WO    WO 2006/016846    *    2/2006

OTHER PUBLICATIONS

Annika Hinze Yann Michel Torsten Schlieder "Approximative Filtering of XML Documents in a Publish/Subscribe System" Twenty-Ninth Australasian Computer Science Conference (ACSC2006).*
Ian Gorton, Justin Almquist, Nick Cramer, Jereme Haack, Mark Hoza "An Efficient, Scalable Content-Based Messaging System" 2003 IEEE.*

* cited by examiner

*Primary Examiner* — Neveen Abel Jalil
*Assistant Examiner* — Polina Peach
(74) *Attorney, Agent, or Firm* — Scully, Scott, Murphy & Presser, P.C.; Jeanine S. Ray-Yarletts, Esq.

(57) ABSTRACT

A method, a system and a computer program product for matching a publication to at least one subscriber are disclosed. After receiving a publication request, a matching engine accesses a hash table to determine whether there is a non-wildcarded match corresponding to the publication request. If the matching engine finds the non-wildcarded match in the hash table, the matching engine omits validating a topic of the publication and provides the non-wildcarded match to the broker device without waiting for a result of searching a wildcarded match. Otherwise, the matching engine validates the topic of the publication. The matching engine also starts to search a wildcarded match in a wildcarded subscription data store. Upon finding the wildcarded match, the matching engine provides the wildcarded match to the broker device. The matching engine provides each result of the findings asynchronously to the broker device.

12 Claims, 8 Drawing Sheets

OPTIMIZING PUBLISH/SUBSCRIBE MATCHING FOR NON-WILDCARDED TOPICS

BACKGROUND

The present invention relates generally to computer network-based publish/subscribe messaging mechanisms. More particularly, the present invention relates to a system and method for matching a publication to at least one subscriber.

A publish/subscribe ("pub/sub") is an asynchronous messaging mechanism where message senders (i.e., publisher or publishing client) do not send messages to specific receivers (i.e., subscriber or subscribing client). In a publish/subscribe network, any number of consumers (i.e., subscribers) of information can receive messages that are provided by one or more producers (i.e., publishers) of that information. In this case, a producer of information is called a publisher and a consumer of that information is called a subscriber.

Publish/subscribe messaging provides the concept of a topic on which any number of interested consumers of information can subscribe in order to register their interest. This is similar to the way that a person might subscribe only to magazines about topics in which they are interested. Each topic provides particular event or state information.

A publisher can send messages containing information about a particular topic to all subscribers to that topic, e.g., via a broker device, without any knowledge of how many subscribers there are, or the details of the nodes that host those subscribers. Because of this, publish/subscribe messaging completely decouples the provider of the information from the consumer of that information.

In order to facilitate this publish/subscribe capability, a broker device is required to hold information about which subscribers have subscribed to which topics and how to deliver messages to them. A publisher can then publish messages using the broker device to all subscribers on that topic without knowing the details of those subscribers. There can be multiple publishers for a particular topic, and a subscriber to information about one topic can also be a publisher of information about other topics.

The broker device is a component to which client devices (i.e., applications or systems) connect to perform publishing and subscribing of messages. The broker device handles matching of publications with subscriptions, distribution of publications to subscribing clients, and persistence (i.e., storing messages in a non-volatile storage) of messages to ensure message delivery at a quality of service required. The broker device acts as a hub for routing messages between clients, and with the aid of a bridge, other messaging servers. The broker device can store messages on behalf of a client that is not connected and make them available to the client when it reconnects. In addition, the broker device can store messages on behalf of the bridge and make them available when the messaging servers that the bridge connects to are available.

The bridge, a middleware in a publish/subscribe messaging system, is an extension of the broker device that routes messages between the broker device and other messaging servers to form sophisticated messaging topologies. The bridge allows messages to be routed between the broker device and messaging servers.

The bridge can route messages between one or more messaging servers. If the bridge cannot connect to a messaging server, messages destined for the messaging server can be stored by the broker device. When the messaging server becomes available, the bridge will connect to it and transfer the stored messages. In addition, the bridge can transfer pending messages from the messaging server to the broker device.

Typically, each type of messaging server supports its own messaging protocol and its own message formats. The bridge plays the role of routing messages across different protocols and transforming messages to a format acceptable by each messaging server.

A matching engine is a sub-component of the broker device that matches a publication to a subscriber. A wildcarded topic is a way of a subscriber matching a number of potential topics in a subscription. A wildcard is typically a special identifier or indication, e.g., a character specified in the subscription. For example, a subscription to a wildcarded topic a/* would match publications to a/b, a/c and so on, since the character means "anything on this hierarchy level" i.e. in this case "a/<anything>". A non-wildcarded topic is a topic with specific identifiers at each level in a hierarchy, e.g., a subscription to a/b will match only publications including the topic a/b.

In a traditional publish/subscribe system, when a subscriber registers its interest in a topic (i.e., a subscription) into a broker device, the broker device records the subscriber and the topic of interest. When a message is published into the broker device, the broker device invokes the matching engine to determine which subscribers subscribe a topic of the published message. For example, a message published to topic a/b would be matched to any subscribers subscribing to topic a/b.

However, the traditional publish/subscribe system becomes delayed when there is a subscriber subscribing the wildcarded topic. For example, the traditional publish/subscribe system delays yielding a non-wildcarded match until yielding a wildcarded match is completed. The wildcarded match refers to a subscriber who specified his/her subscription using a wildcard character, e.g., *, #, and whose subscription encompass a plurality of topics. The non-wildcarded match refers to a subscriber whose subscription exactly matches with a topic on a publication.

Thus, it is desirable to provide a method and a system for efficiently and/or fast matching of a publication to at least one subscriber.

SUMMARY

The present invention describes a method and a system for matching a publication to at least one subscriber, e.g., using a hash table, asynchronously providing a wildcarded match and a non-wildcarded match to a broker device, and/or omitting a validation of a topic of a publication.

In one embodiment, there is provided a computer-implemented method for matching a publication to at least one subscriber, the method comprising:

receiving, at a broker device including a processor, the publication from a publisher, the publication having a first topic;

searching for a non-wildcarded match with said first topic at a non-wildcard subscription data store and a wildcarded match with said first topic at a wildcard subscription data store at a same time, the non-wildcarded match indicating a first subscriber subscribing to a topic exactly matching with the first topic of the publication, the wildcarded match indicating a second subscriber whose subscription includes a wildcard character and whose subscription matches the first topic of the publication;

providing the non-wildcarded match and the wildcarded match asynchronously to the broker; and sending the publication from the broker device to the first and second subscribers.

In one embodiment, there is provided a computer-implemented system for matching a publication to at least one subscriber, the system comprising:

means for receiving the publication from a publisher at a broker device including a processor, the publication having a first topic;

means for searching for a non-wildcarded match with said first topic at a non-wildcard subscription data store and a wildcarded match with said first topic at a wildcard subscription data store at a same time, the non-wildcarded match indicating a first subscriber subscribing to a topic exactly matching with the first topic of the publication, the wildcarded match indicating a second subscriber whose subscription includes a wildcard character and whose subscription matches the first topic of the publication;

means for providing the non-wildcarded match and the wildcarded match asynchronously to the broker; and means for sending the publication from the broker device to the first and second subscribers.

In a further embodiment, if there is the non-wildcarded match at the non-wildcard subscription data store, the broker device omits validating the topic of the publication.

In a further embodiment, the matching engine further comprises:

means for querying a hash table to determine whether there is the non-wildcarded match in the hash table.

BRIEF DESCRIPTION OF THE SEVERAL VIEWS OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

In one embodiment, a matching engine of the pub/sub broker device matches publications and/or publishers to subscribers. The matching engine receives a topic of a publication published by a publisher and yields a set of subscribers subscribing to receive publications/communications associated with the topic. When a subscriber indicates a wildcarded topic as a subscription in the matching engine, the matching engine needs to match inbound publications to the subscriber whenever the wildcarded topic encompasses a topic on a publication, e.g., a wildcarded topic a/* encompass a topic a/b, a/c. If a subscriber wants to subscribe to a non-wildcarded topic, the subscriber submits the non-wildcarded topic in a hash table, e.g., by using TPC/IP socket connection. When searching a non-wildcarded match, the broker device first checks the hash table to find the non-wildcarded match before invoking a matching engine. If the broker finds the non-wildcarded match in the hash table, then the broker does not invoke the matching engine.

In a further embodiment, when the broker device receives a publication, the broker device searches for a non-wildcarded match of the publication in the hash table without validating a topic of the publication. The validation refers to evaluating a syntax correctness of the subscription or the topic. If the broker device finds the non-wildcarded match in the hash table, the broker device omits validating the topic of the publication. When a subscriber submits a subscription (i.e., a topic to subscribe) for a placement in a hash table, e.g., by using a TCP/IP socket connection, the subscription should have passed a validation successfully before placing it. The broker device or the matching engine may perform the validation. Thus, if the broker device obtains the non-wildcarded match in a hash table, then clearly there is no need to revalidate an incoming topic (e.g., the topic of the publication), because the incoming topic is exactly same as a subscription that has already been validated.

In a further embodiment, after the broker device obtains the non-wildcarded match in the hash table without validating the topic of the publication, to achieve a full result set (wildcarded and non-wildcarded matches), the broker device invokes a matching engine to query to find the wildcarded match(es).

In a further embodiment, the broker device asynchronously accesses the hash table to obtain the non-wildcarded match without waiting for the matching engine to yield the wildcarded match. In another embodiment, the matching engine asynchronously accesses the hash table to obtain the non-wildcarded match while and/or before yielding the wildcarded match. As soon as the matching engine obtains the non-wildcarded match from the hash table, the matching engine immediately delivers the non-wildcarded match to the broker device without waiting for the wildcarded match to be yielded.

Figure 1:
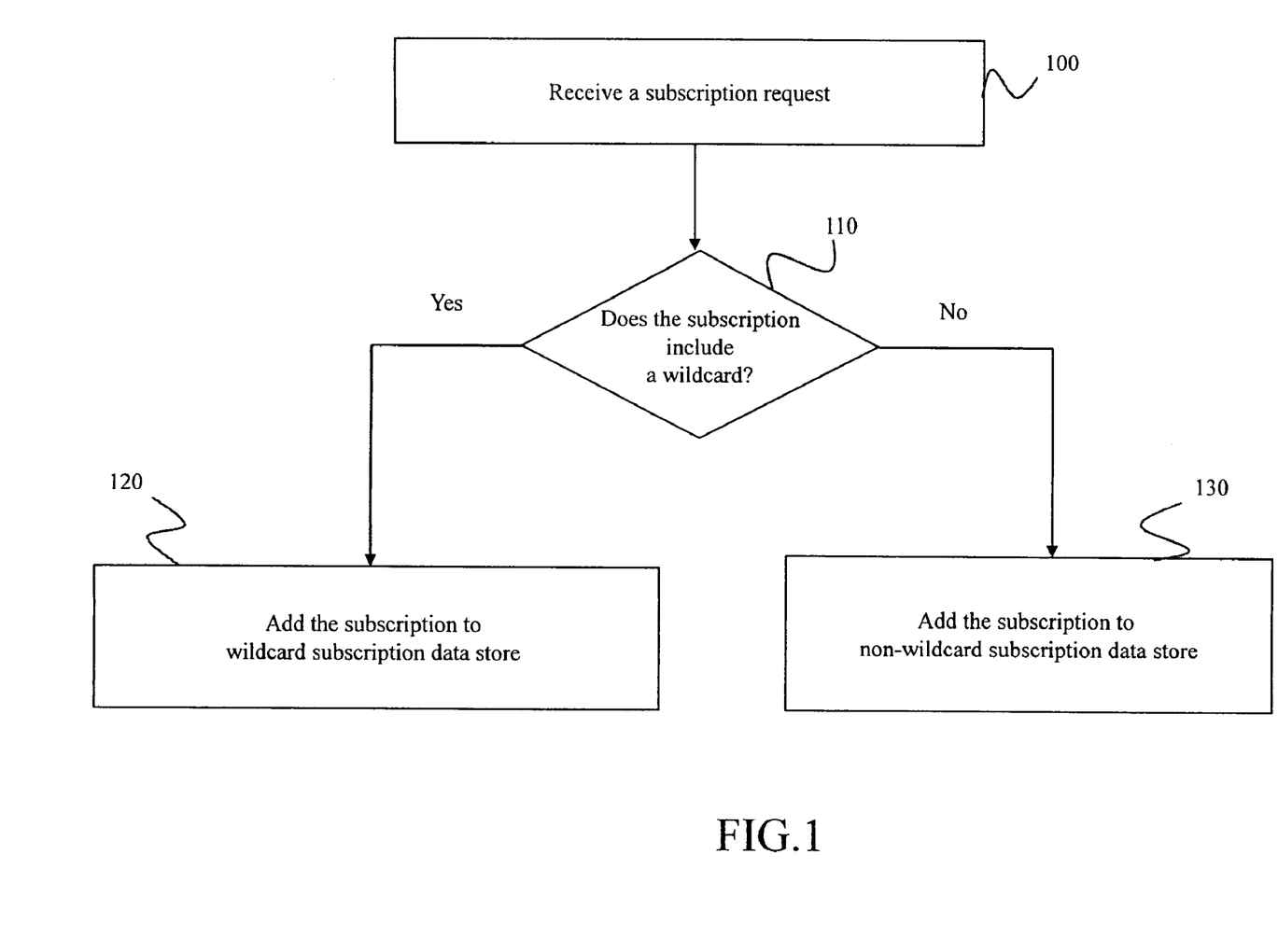
FIG. 1 illustrates a flow chart describing method steps for registering a subscription according to one embodiment.
Figure 3:
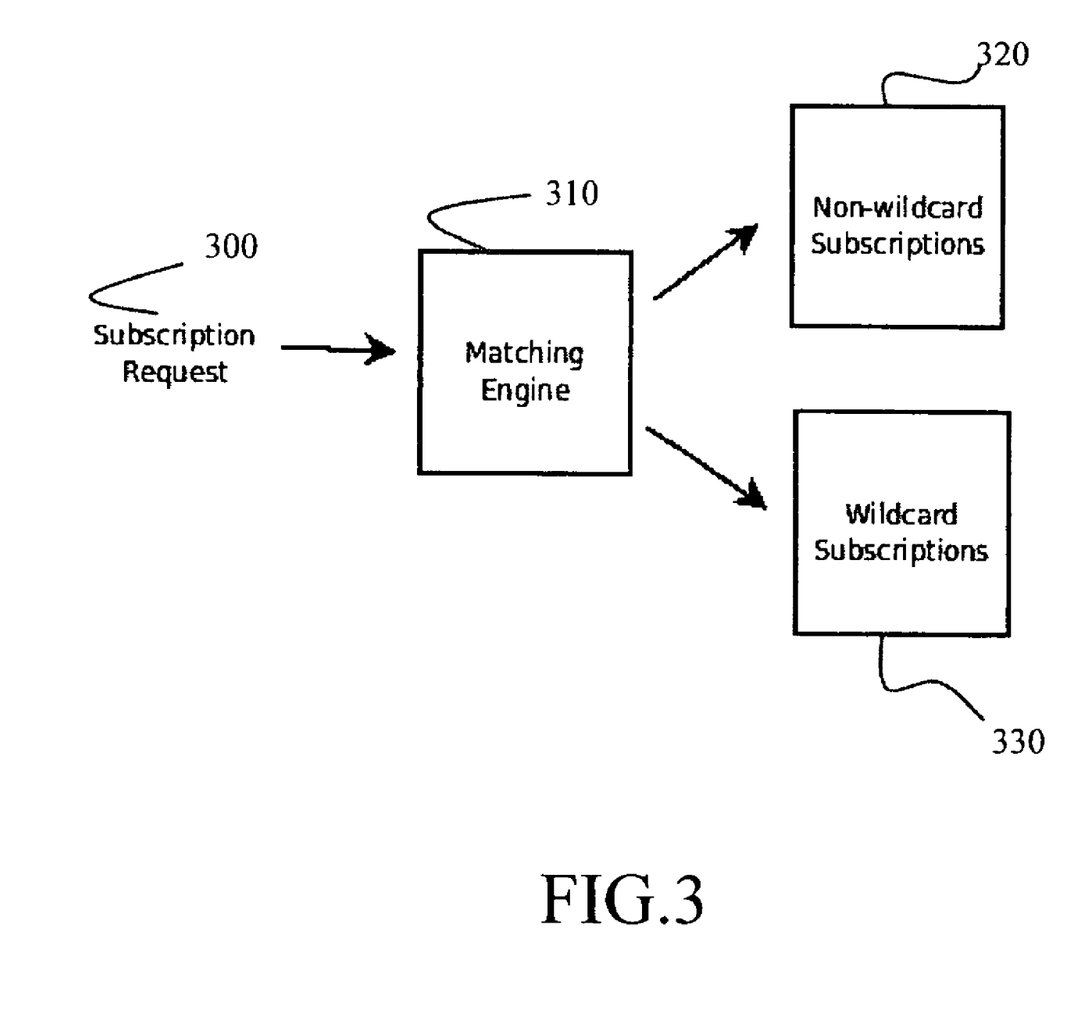
FIG. 3 illustrates a system diagram for registering a subscription according to one embodiment.
Figure 4:
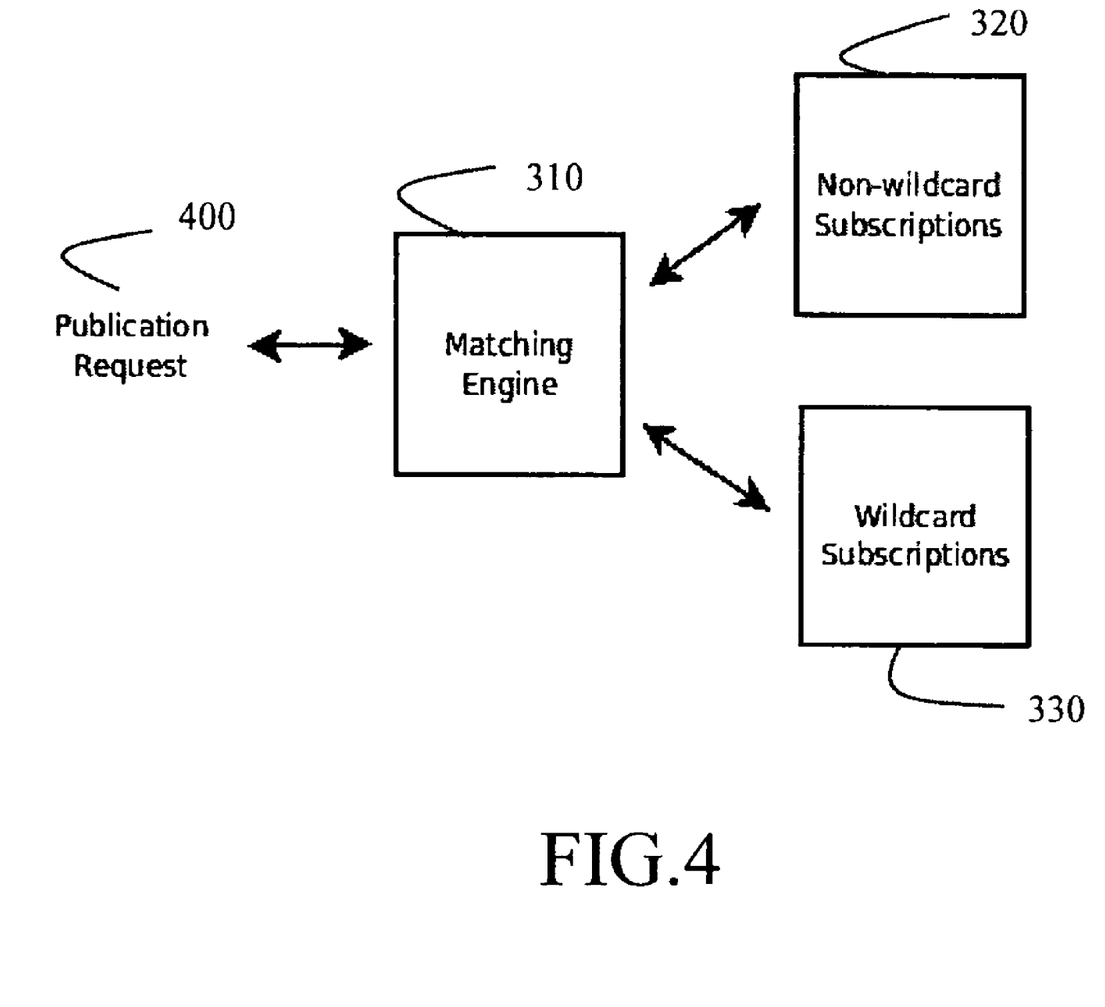
FIG. 4 illustrates a system diagram for matching a publication to at least one subscriber according to one embodiment.

FIG. 1 illustrates a flow chart describing method steps for registering a subscription in a matching engine (e.g., a matching engine 310 in FIG. 3) according to one embodiment. FIG. 3 illustrates a system implementing the method steps in FIG. 1. At step 100 in FIG. 1, the matching engine 310 receives a subscription request (i.e., a request to subscribe publications associated with one or more certain topics; e.g., a subscription request 300 in FIG. 3) from a subscriber (not shown) or a bridge (not shown). At step 110 in FIG. 1, the matching engine 310 evaluates whether a topic specified in the subscription request 300 is a wildcarded topic. The matching engine 310 may evaluate whether a topic is a wildcarded topic or not, e.g., by executing Java® topicString.indexOf("*")!=−1 or Java® topicString.indexOf("#")!=−1, which determines a topic on a subscription includes a wildcard character, e.g., "*", "#" and/or other symbol(s) that represents or signals the wildcard character. If the subscription request includes a wildcarded topic, at step 120 in FIG. 1, the matching engine 310 adds the subscription associated with the subscription request to a wildcard subscription data store (e.g., a wildcard subscription data store 330 in FIG. 3). Otherwise, the matching engine 310 adds the subscription to non-wildcard subscription data store (e.g., a non-wildcard subscription data store 320 in FIG. 3). The wildcard subscription data store 330 and the non-wildcard subscription data store 320 may be a memory device such as RAM. The wildcard subscription data store 330 may be a database such as IBM® DB 2® or Informix®. The matching engine 310 may search the wildcard subscription data store 320 to find a wildcarded match, e.g., by executing a well-known search algorithm such as Breadth-first search algorithm and/or Depth-first search algorithm. The non-wildcard subscription data store 320 may be or include a hash table having a topic or subscription as a key and a list of subscribers subscribing to the topic or subscription as a corresponding value.

In a further embodiment, before adding the subscription to the data store 320 and/or 330, the matching engine validates the subscription. In other words, the matching engine validates topic(s) to be subscribed by the subscriber before adding the topic(s) to the data stores 320-330. The validation involves checking whether syntax of the subscription and/or the topic(s) is correct or valid.

Figure 2:
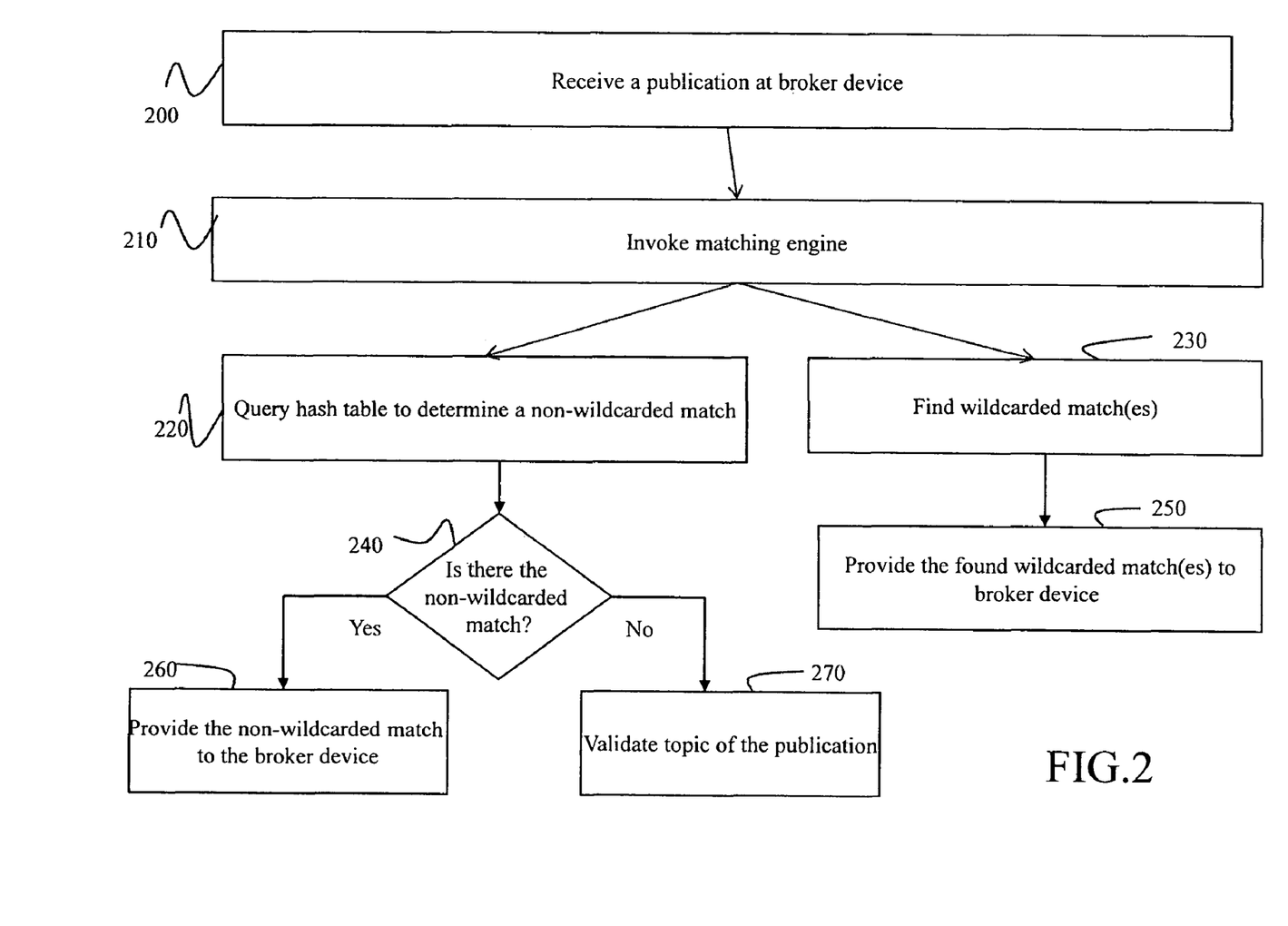
FIG. 2 illustrates a flow chart describing method steps for matching a publication to at least one subscriber according to one embodiment of the present invention.

FIG. 2 illustrates a flow chart describing method steps for matching a publication to at least one subscriber according to one embodiment. FIGS. 4-6 and 8 illustrate examples of systems implementing the method steps in FIG. 2. At step 200 in FIG. 2, a broker device (e.g., a computing system 1600 in FIG. 8 including a processor 1611 and a memory 1614) receives a publication from a publisher. At step 210 in FIG. 2, the broker device issues a publication request of the publication (e.g., a publication request 400 in FIG. 4) and invokes a matching engine (e.g., a matching engine 310 in FIG. 4). Then, the matching engine searches a non-wildcarded match at a non-wildcard subscription data store (e.g., a non-wildcard subscription data store 320 in FIG. 4) and a wildcarded match at a wildcarded subscription data store (e.g., a wildcarded subscription data store 330 in FIG. 4) at the same time, i.e., in parallel, concurrently or simultaneously, e.g., by spawning separate threads each of which independently executes respective functionality for searching the non-wildcarded match and for searching the wildcarded match. The spawned separate threads may guarantee that a callback class receiving a result of a search does not prevent the matching engine from further processing. In other words, spawned threads guarantees that searching the non-wildcarded match and searching wildcarded match are performed concurrently, independently and/or asynchronously. Spawning a thread per each search may depend on available resources (e.g., free memory space, a CPU capability executing threads simultaneously). The callback class refers to a class that handles a method call returned by a corresponding thread or process when asynchronous searching of the non-wildcarded match or the wildcarded match is completed. The non-wildcarded match refers to a first subscriber subscribing to a topic exactly matching with a topic of the publication. The wildcarded match refers to a second subscriber whose subscription includes a wildcard character and whose subscription encompasses or matches the topic of the publication. The matching engine searches the non-wildcarded match and the wildcarded match asynchronously, i.e., searching wildcarded match does not prevent searching non-wildcarded match. The matching engine obtains results of each search asynchronously, i.e., a result of searching the non-wildcarded match does not rely on a result of searching the wildcarded match. In other words, the matching engine provides independently and/or asynchronously the result of searching the non-wildcarded match and the result of searching the wildcarded match to the broker device as soon as each result becomes available. For example, when the matching engine invokes method calls for each search (i.e., a search for a non-wildcarded match and another search for a wildcarded match), the matching engine provides each callback class to receive a result of each search. After receiving the non-wildcard match and the wildcard match, the broker device sends the publication to the first subscriber corresponding to the non-wildcarded match and the second subscriber corresponding to the wildcarded match. The broker device may send the publication asynchronously to the first subscriber and the second subscriber. In other words, the broker device may send the publication to the first subscriber before sending the publication to the second subscriber if the matching engine provides the non-wildcarded match before providing the wildcarded match, and vice versa.

Figure 6:
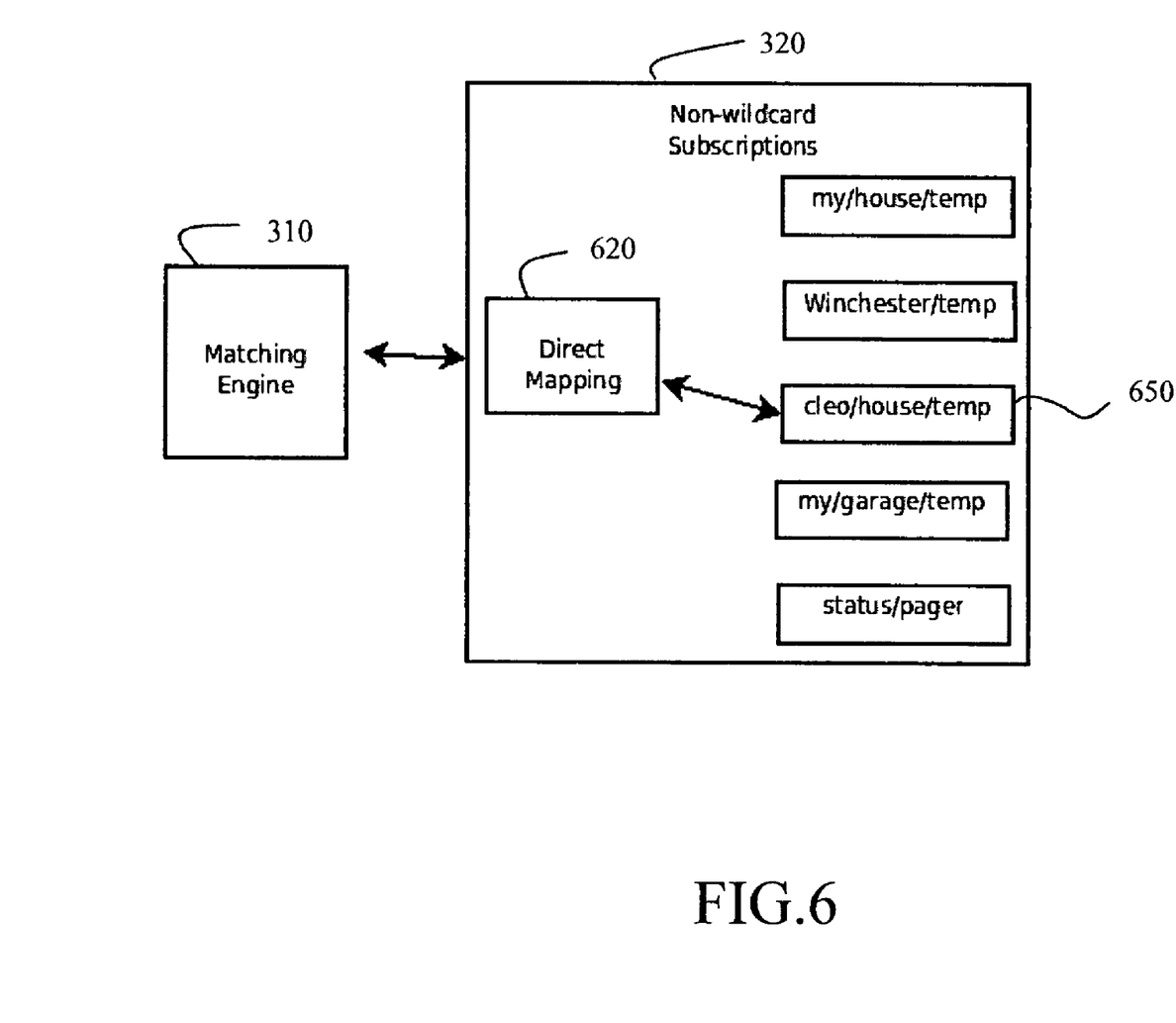
FIG. 6 illustrates a system diagram for searching a non-wildcarded match in a non-wildcard data store.

Returning to FIG. 2, when the matching engine (e.g., a matching engine 310 in FIG. 6) searches the non-wildcarded match at the non-wildcarded subscription data store (e.g., the non-wildcarded subscription data store 320 in FIG. 6), at step 220 in FIG. 2, the matching engine 310 queries a hash table implementing a direct mapping (e.g., a hash table 620 implementing the direct mapping is shown in FIG. 6) to determine whether there is the non-wildcarded match in the hash table 620. Direct mapping refers that a topic can be assigned to only one place in the hash table. Thus, the hash table 620 may be implemented by a direct mapped cache memory device. Any non-wildcarded match found in the hash table 620 (e.g., a cleo/house/temp 650 in FIG. 6) is asynchronously sent to the broker device. In other words, the non-wildcarded match found in the hash table 620 is immediately sent to the broker device without waiting for a result of searching for a wildcarded match.

It should be noted that the broker or the matching engine does not validate a topic of the publication when the matching engine 310 executes method steps 200-220 in FIG. 2. At step 240 in FIG. 2, if the matching engine 310 finds the non-wildcarded match in the hash table 620, i.e., the hash table 620 has an entry having an same exact subscription matching with the topic of the publication, the matching engine 310 or the broker device omits validating the topic of the publication, e.g., because the topic of the publication was successfully validated when the subscription enters the hash table 620. Then, the matching engine 310 provides the non-wildcarded match to the broker device at step 260. Upon receiving the non-wildcarded match, the broker device may send the publication to a subscriber corresponding to the non-wildcarded match.

At step 270 in FIG. 2, if the matching engine 310 does not find the non-wildcarded match in the hash table 620, the matching engine 310 or the broker validates the topic of the publication received at the broker device at step 200. When validating the topic of the publication, the matching engine 310 or the broker device may validate syntax of the topic of the publication, e.g., whether the topic is grammatically correct. If the topic of the publication is incorrect or invalid, the matching engine 310 or the broker contacts the publisher which published the publication to inform that the topic of the publication is invalid or incorrect, e.g., by an email or instant message. The email or the instant message may describe why the topic is incorrect or how the topic can be changed or amended to avoid the incorrectness. Then, the publisher may cancel the publication or re-publish the publication with a new topic according to the email or the instant message. If the topic of the publication is correct or valid, the matching engine 310 or the broker device records that the topic of the publication is successfully evaluated as being correct or valid, e.g., in a tag such as HTML or XML tag on the publication.

Figure 5:
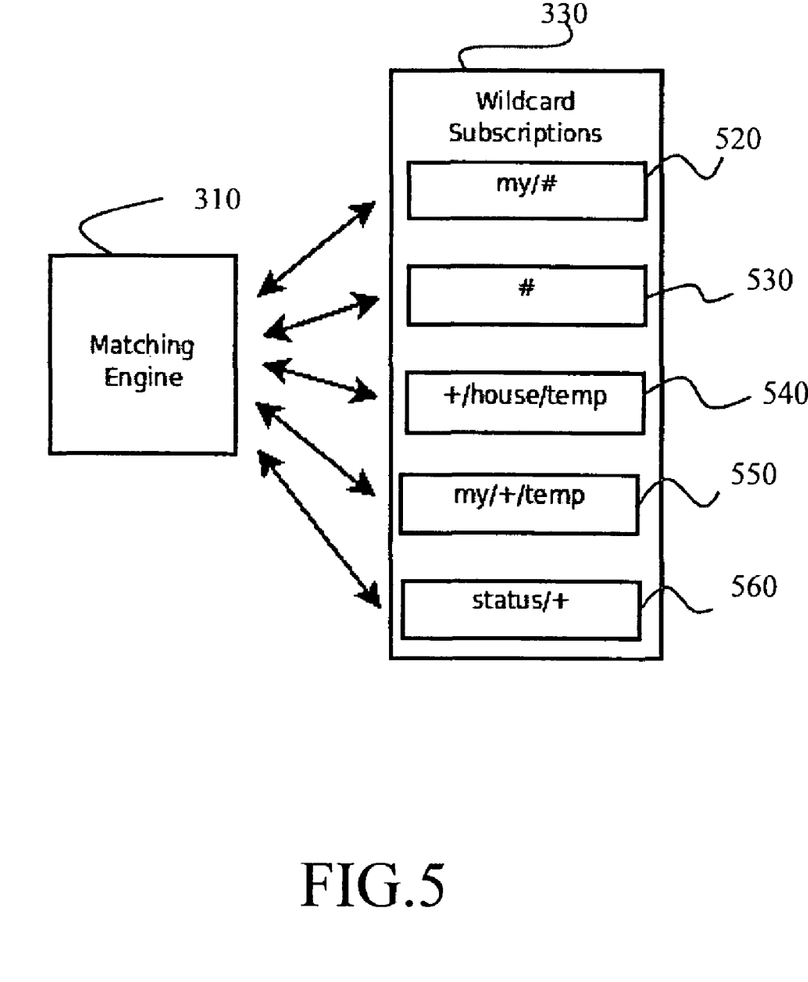
FIG. 5 illustrates a system diagram for searching a wildcarded match in a wildcard subscription data store.

At step 230 in FIG. 2, when the matching engine 310 accesses the hash table 620 to find the non-wildcarded match, at the same time, the matching engine 310 concurrently starts to find a wildcarded match in the wildcard subscription data store 330. As illustrated in FIG. 5, the matching engine 310 may compare the topic of the publication and each wildcarded subscription (e.g., my/#520, #530, +/house/temp 540, my/+/temp 550, status/+ 560) stored in the data store 330. For example, regarding my/# 520 subscription, the matching engine 310 may match a publication whose topic includes my/followed by any string. Regarding #530 subscription, the matching engine 310 may match a publication whose topic includes any string. Regarding +/house/temp/540 subscription, the matching engine 310 may match a publication whose topic includes any string other than/followed by/house/temp/. Regarding my/+/temp 550 subscription, the matching engine 310 may match a publication whose topic includes my/followed by any string other than/followed by/temp. Regarding status/+ 560, the matching engine 310 may match a publication whose topic includes status/followed by any string other than/.

Referring back to FIG. 2, if the matching engine 310 finds that a wildeared topic encompasses the topic of the publication, e.g., a wildcarded topic a/* encompassing a topic a/b, the matching engine 310 provides a corresponding wildcarded match (i.e., a subscriber that registered the wildcarded topic in the data store 330) to the broker device at step 250 in FIG. 2. When the matching engine 310 provides the corresponding wildcarded match to the broker device, the matching engine 310 asynchronously provides the wildcarded match to the broker device without preventing the matching engine's search for the non-wildcarded match. Upon receiving the wildcarded match, the broker device may send the publication to the subscriber corresponding to the wildcarded match.

In a further embodiment, the matching engine 310 validates the topic of the publication at step 230 regardless of whether the non-wildcarded match is found or not. In another embodiment, the matching engine 310 omits validating the topic of the publication while searching the wildcarded match, if the matching engine 310 finds the non-wildcarded match in the hash table 620 or validates the topic of the publication at step 270. The matching engine 310 may find in the publication, e.g., in a tag, that the topic of the publication has been validated before. Alternatively, a thread executing steps 220, 240, 260 and 270 may communicate with another thread executing steps 230 and 250 to inform that the topic of the publication has been validated successfully, e.g., via a return value of a method executing step 270. Validating a topic of a publication delays matching a publication to one or more subscribers. Thus, omitting the validation based on an earlier validation result, e.g., finding a non-wildcarded match in a hash table and/or performing a validation at step 270, expedites the matching between the publication and the one or more subscribers.

In a further embodiment, the matching engine 310 or the broker device searches the non-wildcarded match before searching the wildcarded match and finds the non-wildcarded match before the wildcarded match. In other words, the matching engine 310 or the broker device executes steps 220, 240, 260 and 270 before executing steps 230 and 250. Thus, if the non-wildcarded match is found in the hash table 620, the matching engine 310 or the broker device does not validate the topic of the publication at step 230 before starting to search the wildcarded match.

Figure 7:
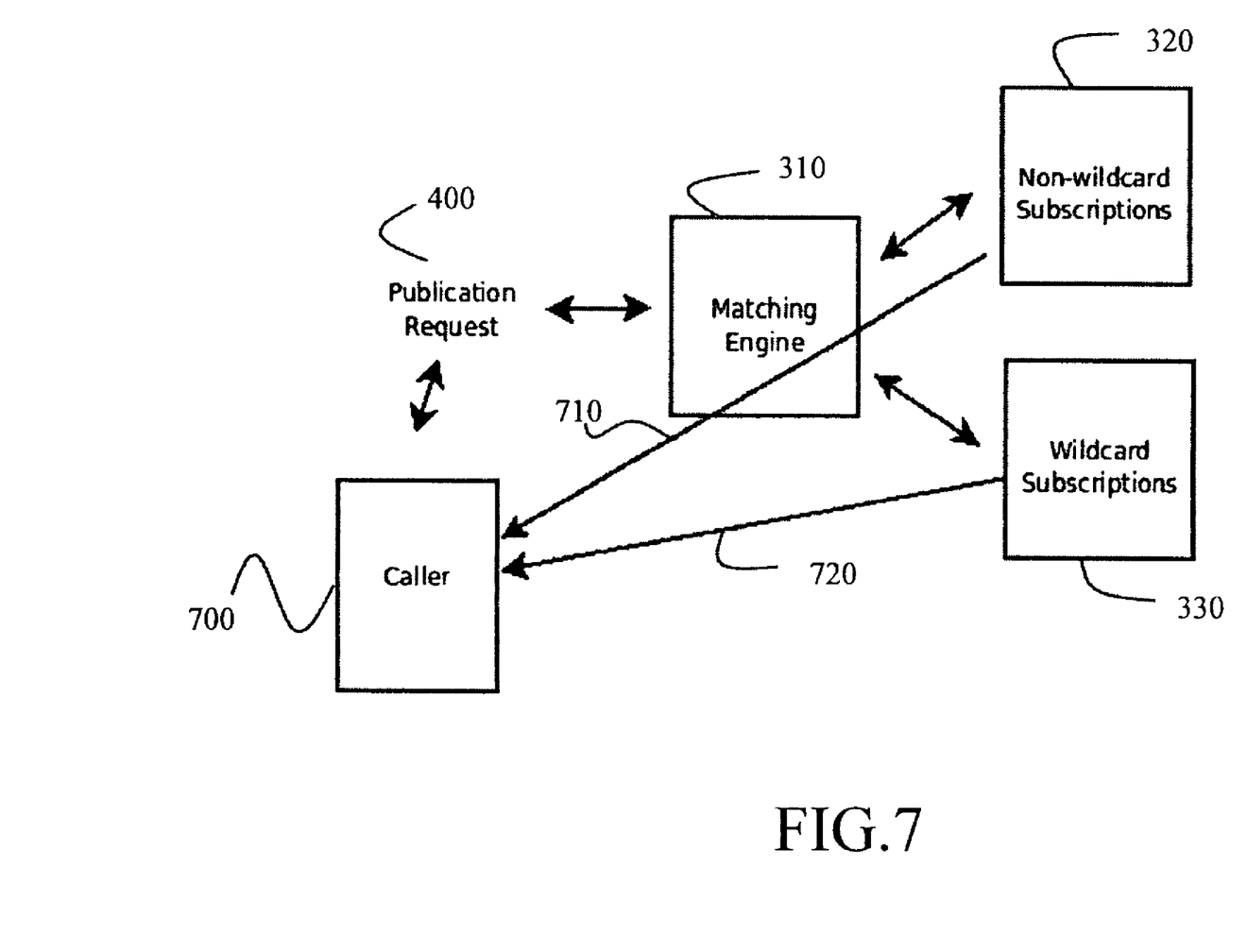
FIG. 7 illustrates a system diagram for providing a non-wildcarded match and a wildcarded match asynchronously from a matching engine to a broker.

FIG. 7 illustrates an asynchronous method for searching a non-wildcarded match and a wildcarded match according to one embodiment of the present invention. When a publication request 400 arrives at a matching engine 310 and a caller module 700 (i.e., a module invoking method calls for searching a non-wildcarded match and wildcarded match), the caller module 700 invoked by the matching engine 310 invokes a first method call to search a non-wildcarded match in a non-wildcard subscription data store 320. By invoking the caller module 700, the matching engine may asynchronously search the non-wildcarded match and the wildcarded match. Without invoking the caller module 700, the matching engine may synchronously search the non-wildcarded match and the wildcarded match. In other words, without invoking the caller module 700, the matching engine may search the wildcarded match first and then search the non-wildcarded match. With invoking the caller module 700 which asynchronously invokes a first method call for searching a non-wildcarded match and a second method call for searching a wildcarded match, the matching engine 310 may independently search the non-wildcarded match and the wildcarded match at the same time. Thus, the caller module 700 enables the matching engine 310 to search the non-wildcarded match and the wildcarded match asynchronously. The caller module 700 may be implemented as a plug-in or API (Application Programming Interface) in the matching engine 310, e.g., using a programming language such as Java®. The matching engine 310 performs matching of a publication to one or more subscribers. The matching engine 310 may be implemented as a computing system (e.g., a system 1600 in FIG. 8) including a processor 1611 and a memory 1614.

Referring back to FIG. 7, after searching the non-wildcarded match, the first method call searching the non-wildcarded match returns a result of the search 710 to the caller module 700. The result of the search 710 may be none or at least one non-wildcarded match. When the caller module 700 invoked by the matching engine 310 invokes the first method call to search a non-wildcarded match, the caller module 700 may also invoke a second method call to search a wildcarded match in a wildcarded subscription data store 330. Then, the second method call searching the wildcarded match returns a result of the search 720. The result of the search 720 may be none or at least one wildcarded match. The first method call and the second method call are executed independently and simultaneously without interfering or blocking each other. The result 710 does not depend on processing of the second method call. The result 720 does not depend on processing of the first method call.

An exemplary implementation illustrating one embodiment of the present invention is now provided. Using a matching engine in a middleware (e.g., WebSphere® Platform Messaging, etc.) for sending messages between two client devices, subscriptions are stored as a set against which queries are executed to determine matches (i.e., non-wildcarded matches and/or wildcarded matches) to a topic of a publication. The matching engine includes entries for these subscriptions. A search of the entries stored in the matching engine is made by invoking a search( ) method which returns a result instance including all matches for a provided search key (i.e. the topic of the publication). An exemplary system and method of the present invention may be implemented as follows according to this exemplary implementation scenario:

API (Application Programming Interface) of the search( ) method may be modified to take a callback object (i.e., an object instanced from the callback class) to be notified for every match (i.e. a non-wildcarded match and wildcarded match).

Within the matching engine, the hash table 620 may be implemented, e.g., by using a Java® Hashtable class under java.util.Hashtable.

Entries in the hash table may be Java® Vectors (i.e., objects instanced from java.util.Vector class). The entries in the hash table are accessible according to topics of publications.

When a call to the search( ) method (i.e., a function call to search a non-wildcarded match) is made, the hash table is queried for a given topic. If null is returned (i.e. no matches) from the hash table, the callback object is returned with an empty result set and control moves to perform a search of wildcarded matches held within the matching engine. Validating the topic of the publication may be applied, if the empty result set is returned.

Otherwise, a result set is formed from returned entries and the callback object is invoked with the result set. The returned entries may include non-wildcarded matches. Validating the topic of the publication may be omitted, if the result set includes the returned entries. In other words, a publication including a non-wildcarded string as a topic arrives at the matching engine. (A publication cannot have a wildcarded topic. However, a subscription can be either wildcarded or non-wildcarded.) When the publication arrives at the matching engine, the matching engine compares the non-wildcared topic of the publication to entries of non-wildcarded subscriptions in the hash table. This comparison is a direct mapping (i.e., one-to-one comparison or one-to-one matching).

The matching engine is then queried to determine any wildcarded matches and these are returned as a subsequent result set. In other words, the non-wildcarded topic of the publication is compared to entries of wildcarded subscription to find a match. For example, a non-wildcarded topic "status/pager" may match to subscriptions "status/+" (560) and "#" (530) in FIG. 5. Thus, matching between a non-wildcarded topic and wildcarded subscriptions are one-to-many (i.e., multiple) matches. Alternatively, the matching engine is queried to determine a wildcarded match at the same time when the hash table is queried. Validating the topic of the publication may be omitted when the matching engine is queried to determine a wildcarded match, because the topic of the publication is already validated when registering a corresponding subscription or when the empty result set is returned.

If the matching engine finds either a non-wildcarded match (i.e., a match between a publication having a non-wildcarded topic and a subscriber having that non-wildcarded subscription) or a wildcarded match (i.e., a match between a publication having a non-wildcarded topic and subscribers having wildcarded subscriptions covering that non-wildcarded topic), the matching engine sends the publication to the matched subscriber(s). Thus, a publication having a non-wildcarded topic can have multiple subscribers. For example, the matching engine delivers a publication whose topic is "status/pager" to every subscriber whose subscription is "status/+" (560) or "#" (530).

Figure 8:
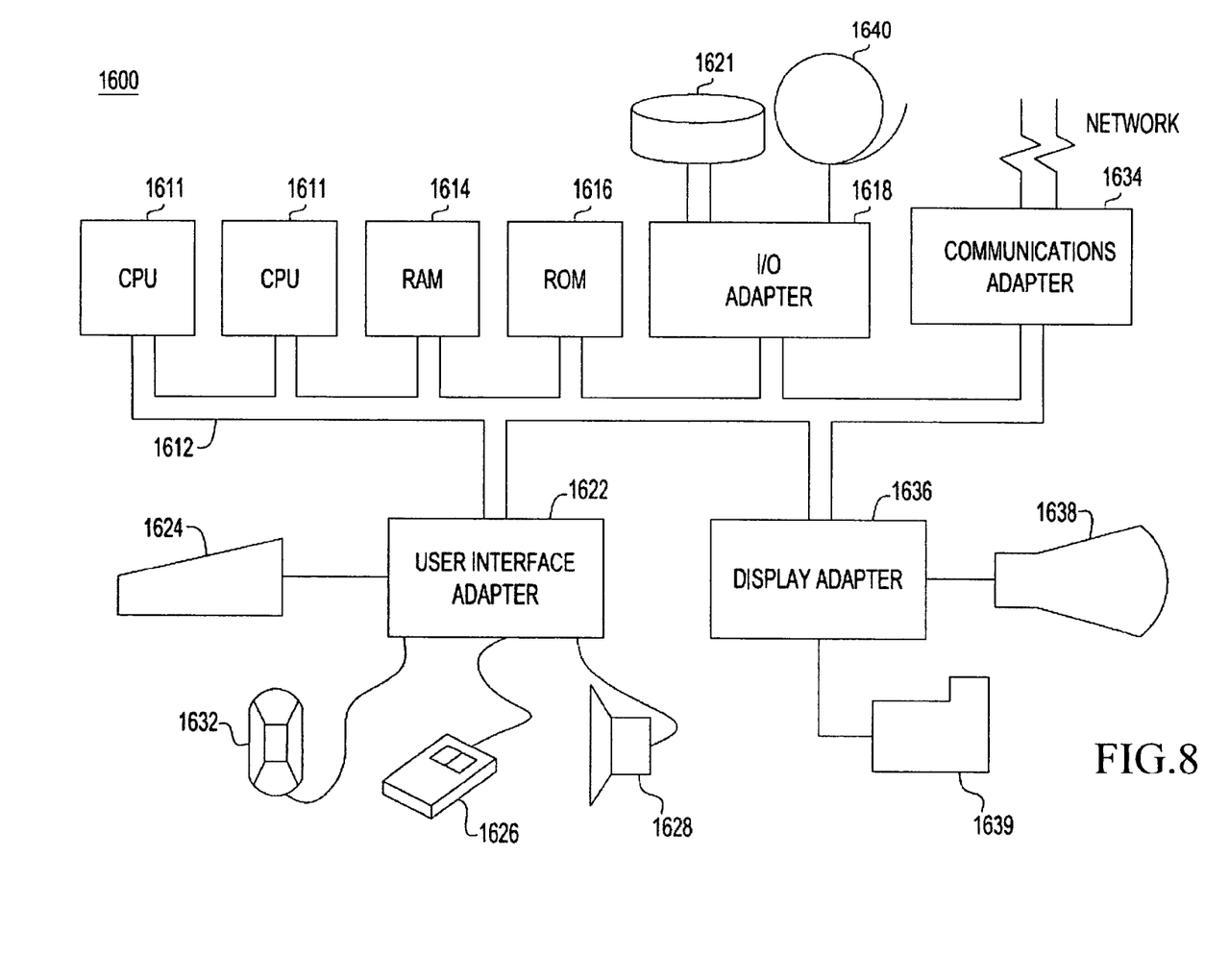
FIG. 8 illustrates hardware configuration implementing a broker device and/or a matching engine according to one embodiment.

FIG. 8 illustrates a hardware configuration of a computing system 1600, e.g., the broker device and/or the matching engine 310, executing the method steps in FIGS. 1-2. The hardware configuration preferably has at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting the system 1600 to a data processing network, the Internet, an Intranet, a personal area network (PAN), etc., and a display adapter 1636 for connecting the bus 1612 to a display device 1638 and/or printer 1639 (e.g., a digital printer of the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) executed by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is executed by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method for expediting of matching a publication to at least one subscriber by simultaneously searching two separate data stores, which are a non-wildcarded subscription data store and a wildcarded subscription data store, the method comprising:
    receiving, at a broker device including a processor, the publication from a publisher, the publication having a first topic;
    simultaneously searching for a non-wildcarded match with said first topic at the non-wildcard subscription data store and a wildcarded match with said first topic at the wildcard subscription data store by spawning separate threads and running the spawn threads in parallel, each spawned thread independently searching each data store, the spawned threads guaranteeing that receiving a result of the searching does not prevent further processing of the non-wildcarded match and the wildcarded match, the spawn threads communicating each other and sharing the search result each other, the non-wildcarded match indicating a first subscriber subscribing to a topic exactly matching with the first topic of the publication, the wildcarded match indicating a second subscriber whose subscription includes a wildcard character and whose subscription encompasses the first topic of the publication, the non-wildcard subscription data store including a hash table, implemented by a direct mapped cache memory device, providing a mapping of topics to one or more subscribers;
    determining, from the mapping of the topics in the hash table, whether there exists a non-wildcarded match of the first topic of the publication at the non-wildcarded subscription data store; and
    validating, by the broker device, the first topic of the publication, in response to determining that no non-wildcarded match exists at the non-wildcard subscription data store, the spawned threads sharing results of the validating with each other;
    omitting the step of validating, by the broker device, the first topic of the publication, upon determining that the non-wildcarded match of the first topic of the publication exists at the non-wildcarded subscription data store;
    determining whether the first topic of the publication is incorrect and how the first topic can be amended to avoid the incorrectness;
    in response to determining that the first topic of the publication is incorrect, informing the publisher about the incorrectness and how the first topic can be amended;
    upon being informed, re-publishing, by the publisher, the publication with a new topic;
    providing the non-wildcarded match of the first topic, when existing, or the wildcarded match of the first topic asynchronously to the broker device, wherein non-wildcarded match is immediately provided to the broker device without waiting until finding the wildcarded match when the non-wildcarded match exists; and
    sending the received or re-published publication from the broker device to the first and second subscribers.

2. The computer-implemented method according to claim 1, wherein the broker device validates syntax of the first topic of the publication.

3. The computer-implemented method according to claim 1, wherein the searching for the non-wildcarded match at the non-wildcard subscription data store comprises: querying the hash table to determine whether there is the non-wildcarded match in the hash table.

4. The computer-implemented method according to claim 1, wherein the broker device sends the publication asynchronously to the first subscriber and the second subscriber.

5. The computer-implemented method according to claim 1, wherein the broker searches the non-wildcarded match before searching the wildcarded match and finds the non-wildcarded match before the wildcarded match.

6. A computer-implemented system for expediting of matching a publication to at least one subscriber by simultaneously searching two separate data stores, which are a non-wildcarded subscription data store and a wildcarded subscription data store, the system comprising:
    a broker device, implemented by a computing system including at least one processor and at least one memory device coupled to the at least one processor,
    wherein the broker device is configured to:
        receive the publication from a publisher, the publication having a first topic; simultaneously search for a non-wildcarded match with said first topic at the non-wildcard subscription data store and a wildcarded match with said first topic at the wildcard subscription data store by spawning separate threads and running the spawn threads in parallel, each spawned thread independently searching each data store, the spawned threads guaranteeing the result of the searching does not prevent further processing of the non-wildcarded match and the wildcarded match, the spawn threads communicating each other and sharing the search result each other, the non-wildcarded match indicating a first subscriber subscribing to a topic exactly matching with the first topic of the publication, the wildcarded match indicating a second subscriber whose subscription includes a wildcard character and whose subscription encompasses the first topic of the publication, the non-wildcard subscription data store including a hash table, implemented by a direct mapped cache memory device~providing a mapping of topics to one or more subscribers;
        determine, from the mapping in the hash table, whether there exists a non-wildcarded match of the first topic of the publication at the non-wildcarded subscription data store;
        validate the first topic of the publication, in response to determining that there is no non-wildcarded match at the non-wildcard subscription data store, the spawned threads sharing results of the validating with each other; or
        omit the validation of the first topic of the publication, upon determining that the non-wildcarded match of the first topic of the publication exists at the non-wildcarded subscription data store;

determine whether the topic of the publication is incorrect and how the first topic can be amended to avoid the incorrectness;

contact the publisher to inform that the first topic is incorrect and to inform how the first topic can be amended to avoid the incorrectness in response to determining that the first topic of the publication is incorrect;

determine whether the first topic of the publication is incorrect and how the first topic can be amended to avoid the incorrectness;

inform the publisher about the incorrectness and how the first topic can be amended; upon being informed, re-publish, by the publisher, the publication with a new topic;

receive the non-wildcarded match of the first topic, when existing, or the wildcarded match of the first topic asynchronously, wherein non-wildcarded match is immediately provided to the broker device without waiting until finding the wildcarded match when the non-wildcarded match exists; and send the received or re-published publication to the first and second subscribers.

7. The computer-implemented system according to claim 6, wherein the broker device validates syntax of the first topic of the publication.

8. The computer-implemented system according to claim 6, wherein the broker device is further configured to query the hash table to determine whether there is the non-wildcarded match in the hash table.

9. The computer-implemented system according to claim 6, wherein the broker device sends the publication asynchronously to the first subscriber and the second subscriber.

10. The computer-implemented system according to claim 6, wherein the broker searches the non-wildcarded match before searching the wildcarded match and finds the non-wildcarded match before the wildcarded match.

11. A non-transitory computer readable medium embodying computer program instructions being executed by a processor for causing a computer to perform method steps for matching a publication to at least one subscriber, said method steps comprising the steps of claim 1.

12. A method of deploying a computer program product including programs of instructions in a non-transitory computer readable medium for matching a publication to at least one subscriber, wherein, when the programs of instructions are executed by at least one processor, the computer program product performs the steps of claim 1.

* * * * *